United States Patent
Jikuhara et al.

(10) Patent No.: US 12,462,687 B2
(45) Date of Patent: Nov. 4, 2025

(54) INFORMATION PROCESSING APPARATUS, SYSTEM, METHOD, AND NON-TRANSITORY COMPUTER READABLE MEDIUM

(71) Applicant: TOYOTA JIDOSHA KABUSHIKI KAISHA, Toyota (JP)

(72) Inventors: Yoshikazu Jikuhara, Miyoshi (JP); Seii Sai, Yokohama (JP); Ibuki Shimada, Miyoshi (JP); Takahiro Aoki, Saitama (JP); Keishi Kinoshita, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 18/337,529

(22) Filed: Jun. 20, 2023

(65) Prior Publication Data
US 2024/0005797 A1 Jan. 4, 2024

(30) Foreign Application Priority Data
Jun. 29, 2022 (JP) ................. 2022-104980

(51) Int. Cl.
*G08G 1/00* (2006.01)
*G16H 40/20* (2018.01)
(52) U.S. Cl.
CPC ............ *G08G 1/202* (2013.01); *G16H 40/20* (2018.01)
(58) Field of Classification Search
CPC .. G08G 1/202; G16H 40/20; G06Q 10/06311; G06Q 10/20
See application file for complete search history.

(56) References Cited

U.S. PATENT DOCUMENTS

| 9,946,840 B1* | 4/2018 | Kemp | G16H 50/30 |
|---|---|---|---|
| 2012/0191476 A1* | 7/2012 | Reid | G16H 10/65 |
| | | | 705/3 |
| 2017/0024537 A1* | 1/2017 | Ferlito | G16H 40/67 |
| 2017/0124277 A1* | 5/2017 | Shlagman | G16H 40/67 |
| 2019/0343727 A1* | 11/2019 | Schulz | A61J 1/16 |
| 2020/0098461 A1* | 3/2020 | Macoviak | G06Q 30/018 |
| 2021/0035038 A1 | 2/2021 | Suzuki et al. | |

FOREIGN PATENT DOCUMENTS

JP 2021022332 A 2/2021

OTHER PUBLICATIONS

Grifantini, Kristina, et al., "Self Driving and Self Diagnosing: With Emerging Technology, Your Car May Soon Serve Not Only as Personal Chauffeur and Entertainment Center but as a Health Advisor Too", IEEE Pulse (vol. 9, Issue: 4, 2018, pp. 4-7) (Year: 2018).*

* cited by examiner

*Primary Examiner* — Amber A Misiaszek
(74) *Attorney, Agent, or Firm* — Dickinson Wright, PLLC

(57) ABSTRACT

A controller of an information processing apparatus is configured to acquire information indicating a work shift of a staff member on board a first vehicle in which a medical checkup is being performed, or information indicating a number of remaining pieces of equipment on board the first vehicle, and determine to dispatch a second vehicle with a new staff member on board or new equipment on board to a stopping location of the first vehicle upon determining, based on the acquired information, that the staff member needs to be replaced or the equipment needs to be replenished.

19 Claims, 5 Drawing Sheets

INFORMATION PROCESSING APPARATUS, SYSTEM, METHOD, AND NON-TRANSITORY COMPUTER READABLE MEDIUM

CROSS-REFERENCE TO RELATED APPLICATION

This application claims priority to Japanese Patent Application No. 2022-104980 filed on Jun. 29, 2022, the entire contents of which are incorporated herein by reference.

TECHNICAL FIELD

The present disclosure relates to an information processing apparatus, a system, a method, and a program.

BACKGROUND

Patent Literature (PTL) 1 discloses technology for determining medical checkup equipment to be installed in a vehicle based on information on users who plan to receive medical checkups.

CITATION LIST

Patent Literature

PTL 1: JP 2021-022332 A

SUMMARY

With conventional technology, in a case in which a vehicle needs to return to a hospital due to a work shift of a staff member on board the vehicle or a shortage of equipment on board the vehicle, travel time for the vehicle is incurred, thus reducing efficiency in performing medical checkups. Therefore, there is room for enhancement with respect to technology for improving efficiency in performing medical checkups.

It would be helpful to provide technology for improving efficiency in performing medical checkups.

An information processing apparatus according to an embodiment of the present disclosure includes a controller configured to:
acquire information indicating a work shift of a staff member on board a first vehicle in which a medical checkup is being performed, or information indicating a number of remaining pieces of equipment on board the first vehicle; and
determine to dispatch a second vehicle with a new staff member on board or new equipment on board to a stopping location of the first vehicle upon determining, based on the acquired information, that the staff member needs to be replaced or the equipment needs to be replenished.

A method according to an embodiment of the present disclosure is a method performed by an information processing apparatus, the method including:
acquiring information indicating a work shift of a staff member on board a first vehicle in which a medical checkup is being performed, or information indicating a number of remaining pieces of equipment on board the first vehicle; and
determining to dispatch a second vehicle with a new staff member on board or new equipment on board to a stopping location of the first vehicle upon determining, based on the acquired information, that the staff member needs to be replaced or the equipment needs to be replenished.

A program according to an embodiment of the present disclosure is configured to cause a computer to execute operations, the operations comprising:
acquiring information indicating a work shift of a staff member on board a first vehicle in which a medical checkup is being performed, or information indicating a number of remaining pieces of equipment on board the first vehicle; and
determining to dispatch a second vehicle with a new staff member on board or new equipment on board to a stopping location of the first vehicle upon determining, based on the acquired information, that the staff member needs to be replaced or the equipment needs to be replenished.

According to an embodiment of the present disclosure, technology for improving efficiency in performing medical checkups can be provided.

BRIEF DESCRIPTION OF THE DRAWINGS

In the accompanying drawings

DETAILED DESCRIPTION

Hereinafter, an embodiment of the present disclosure will be described.

Figure 1:
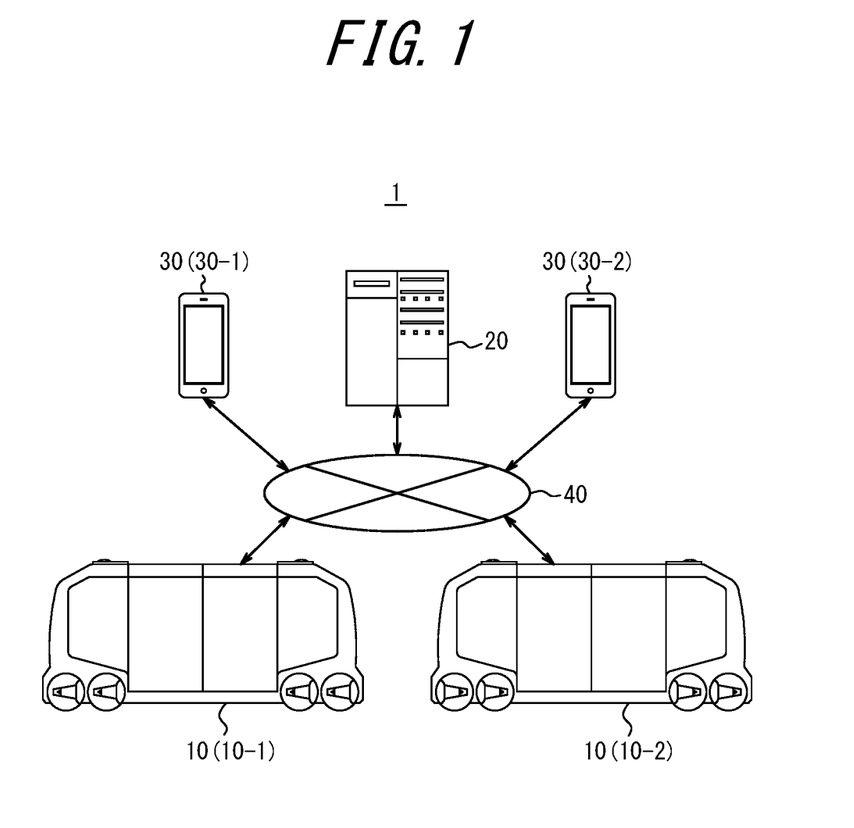
FIG. 1 is a block diagram illustrating a schematic configuration of a system according to an embodiment of the present disclosure.

An outline of a system 1 according to the embodiment of the present disclosure will be described with reference to FIG. 1.

The system 1 includes a first vehicle 10-1, a second vehicle 10-2, an information processing apparatus 20, a first terminal apparatus 30-1, and a second terminal apparatus 30-2. The first vehicle 10-1 and the second vehicle 10-2 may hereinafter be abbreviated simply as vehicles 10. The first terminal apparatus 30-1 and the second terminal apparatus 30-2 may be abbreviated simply as terminal apparatuses 30. The vehicles 10, the information processing apparatus 20, and the terminal apparatuses 30 are communicably connected to a network 40.

Each of the vehicles 10 is, for example, an automobile equipped with equipment used for medical checkups, but not limited to this and may be any vehicle. The automobile is, for example, a gasoline vehicle, a battery electric vehicle (BEV), a hybrid electric vehicle (HEV), a plug-in hybrid electric vehicle (PHEV), a fuel cell electric vehicle (FCEV), or the like, but is not limited to these. The vehicles 10 may each be driven by a driver, or the driving may be automated at any level. The level of automation is, for example, one of level 1 to level 5 according to the classification of the Society of Automotive Engineers (SAE). The equipment used for medical checkups may include, for example, a blood pressure monitor, blood testing equipment, an electrocardiograph, X-ray imaging equipment, ultrasound equipment, computed tomography (CT) equipment, or magnetic resonance imaging (MRI) equipment, but is not limited to these.

The information processing apparatus 20 is a computer such as a server that belongs to a cloud computing system or another type of computing system.

Each of the terminal apparatuses 30 is a mobile device such as a mobile phone, a smartphone, or a tablet.

The network 40 includes the Internet, at least one wide area network (WAN), at least one metropolitan area network (MAN), or any combination thereof. The network 40 may include at least one wireless network, at least one optical network, or any combination thereof. The wireless network is, for example, an ad hoc network, a cellular network, a wireless local area network (LAN), a satellite communication network, or a terrestrial microwave network.

An outline of the present embodiment will be described with reference to FIG. 1. A controller 21 of the information processing apparatus 20 acquires, via a communication interface 22, information indicating the number of remaining pieces of equipment on board the first vehicle 10-1 in which medical checkups are being performed. Upon determining, based on the acquired information, that the equipment needs to be replenished, the controller 21 of the information processing apparatus 20 determines to dispatch the second vehicle 10-2 with new equipment on board to a stopping location of the first vehicle 10-1.

According to the present embodiment, medical checkups can be performed continuously without being affected by a shortage or the like of the equipment on board the first vehicle 10-1. Thus, even if the equipment is about to run out during medical checkups, there is no need to interrupt the medical checkups and move the first vehicle 10-1 to replenish the equipment, thereby increasing the number of available appointment slots for medical checkups. Thus, efficiency in performing medical checkups can be improved.

Figure 2:
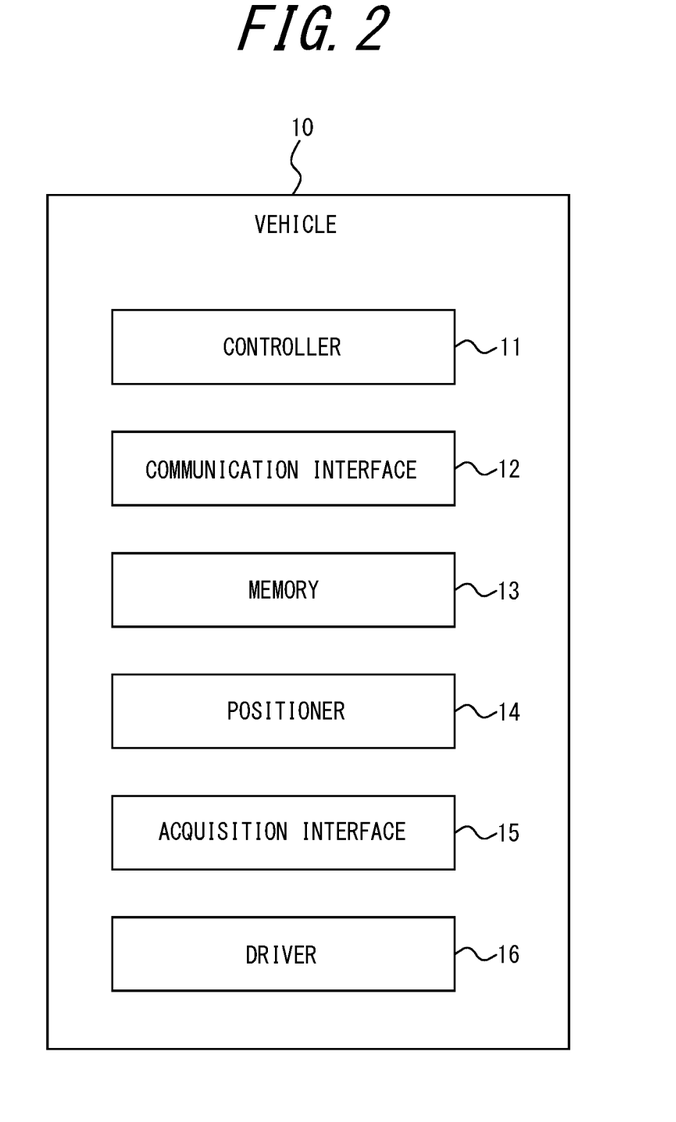
FIG. 2 is a block diagram illustrating a schematic configuration of a vehicle according to the embodiment of the present disclosure.

A configuration of the vehicles 10 according to the present embodiment will be described with reference to FIG. 2.

The vehicles 10 each include a controller 11, a communication interface 12, a memory 13, a positioner 14, an acquisition interface 15, and a driver 16.

The controller 11 includes at least one processor, at least one programmable circuit, at least one dedicated circuit, or any combination thereof. The processor is a general purpose processor such as a central processing unit (CPU) or a graphics processing unit (GPU), or a dedicated processor that is dedicated to specific processing. The programmable circuit is, for example, a field-programmable gate array (FPGA). The dedicated circuit is, for example, an application specific integrated circuit (ASIC). The controller 11 executes processes related to operations of the vehicle 10 while controlling components of the vehicle 10.

The communication interface 12 includes at least one interface for communication. The interface for communication is, for example, an interface compliant with a mobile communication standard such as a Long Term Evolution (LTE), the 4th generation (4G) standard, or the 5th generation (5G) standard, an interface compliant with a short-range wireless communication standard such as Bluetooth® (Bluetooth is a registered trademark in Japan, other countries, or both), or a LAN interface. The communication interface 12 receives data to be used for the operations of the vehicle 10, and transmits data obtained by the operations of the vehicle 10.

The memory 13 includes at least one semiconductor memory, at least one magnetic memory, at least one optical memory, or any combination thereof. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 13 functions as, for example, a main memory, an auxiliary memory, or a cache memory. The memory 13 stores data to be used for the operations of the vehicle 10 and data obtained by the operations of the vehicle 10. In the present embodiment, the data to be used for the operations of the vehicle 10 includes a system program, an application program, a database, map information, and the like.

The positioner 14 includes one or more receivers compliant with any appropriate satellite positioning system. For example, the positioner 14 may include a Global Positioning System (GPS) receiver. The positioner 14 acquires a measured value of the position of the vehicle 10 as positional information. The positional information includes an address, a latitude, a longitude, an altitude, and the like. The positioner 14 is capable of acquiring the positional information on the vehicle 10. The positioner 14 may acquire the positional information on the vehicle 10 continually, periodically, or non-periodically.

The acquisition interface 15 includes one or more sensor modules capable of acquiring information necessary for automatic driving of the vehicle 10. The sensor modules include, but are not limited to, speed sensors, acceleration sensors, angular rate sensors, steering angle sensors, or the like.

The driver 16 includes any drive mechanism that enables loading of equipment into the vehicle 10 and unloading of equipment on board the vehicle 10. For example, the driver 16 may be an arm or slide mechanism driven by a motor.

Figure 3:
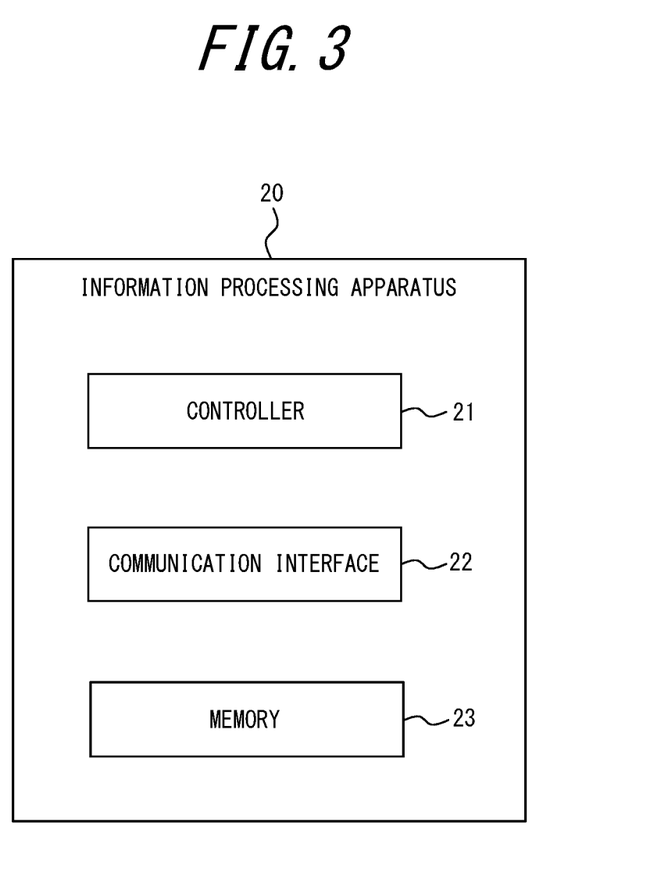
FIG. 3 is a block diagram illustrating a schematic configuration of an information processing apparatus according to the embodiment of the present disclosure.

A configuration of the information processing apparatus 20 according to the present embodiment will be described with reference to FIG. 3.

The information processing apparatus 20 includes the controller 21, the communication interface 22, and a memory 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 21 executes processes related to operations of the information processing apparatus 20 while controlling components of the information processing apparatus 20.

The communication interface 22 includes at least one interface for communication. The interface for communication is compliant with, for example, a mobile communication standard, a wired LAN standard, or a wireless LAN standard, but not limited to these, and may be compliant with any communication standard. The communication interface 22 receives data to be used for the operations of the information processing apparatus 20, and transmits data obtained by the operations of the information processing apparatus 20.

The memory 23 includes at least one semiconductor memory, at least one magnetic memory, at least one optical memory, or any combination thereof. The semiconductor memory is, for example, RAM or ROM. The RAM is, for example, SRAM or DRAM. The ROM is, for example, EEPROM. The memory 23 functions as, for example, a main memory, an auxiliary memory, or a cache memory. The memory 23 stores data to be used for the operations of the information processing apparatus 20 and data obtained by the operations of the information processing apparatus 20. In the present embodiment, the data to be used for the operations of the information processing apparatus 20 includes a system program, an application program, a database, map information, and the like.

Figure 4:
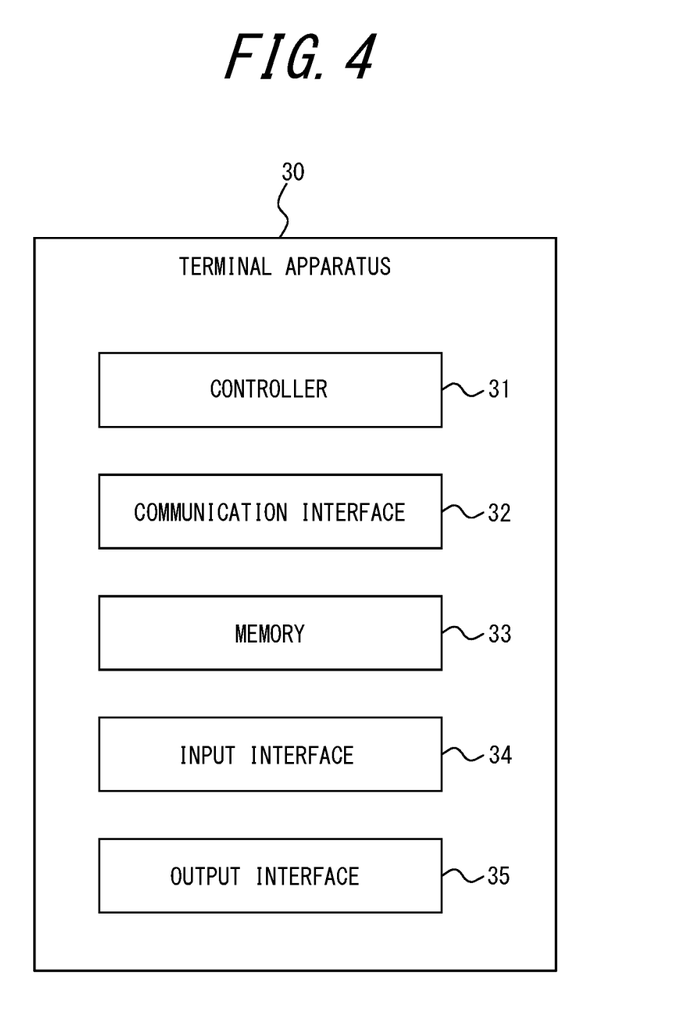
FIG. 4 is a block diagram illustrating a schematic configuration of a terminal apparatus according to the embodiment of the present disclosure.

A configuration of the terminal apparatus 30 according to the present embodiment will be described with reference to FIG. 4.

Each terminal apparatus 30 includes a controller 31, a communication interface 32, a memory 33, an input interface 34, and an output interface 35.

The controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 31 executes processes related to operations of the terminal apparatus 30 while controlling components of the terminal apparatus 30.

The communication interface 32 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The communication interface 32 receives data to be used for the operations of the terminal apparatus 30, and transmits data obtained by the operations of the terminal apparatus 30.

The memory 33 includes at least one semiconductor memory, at least one magnetic memory, at least one optical memory, or any combination thereof. The semiconductor memory is, for example, RAM or ROM. The RAM is, for example, SRAM or DRAM. The ROM is, for example, EEPROM. The memory 33 functions as, for example, a main memory, an auxiliary memory, or a cache memory. The memory 33 stores data to be used for the operations of the terminal apparatus 30 and data obtained by the operations of the terminal apparatus 30.

The input interface 34 includes at least one interface for input. The interface for input is, for example, a physical key, a capacitive key, a pointing device, a touch screen integrally provided with a display, a camera, a light detection and ranging or laser imaging, detection, and ranging (LiDAR) sensor, or a microphone. The input interface 34 accepts an operation for inputting data to be used for the operations of the terminal apparatus 30. The input interface 34, instead of being included in the terminal apparatus 30, may be connected to the terminal apparatus 30 as an external input device. As an interface for connection, for example, an interface compliant with a standard such as Universal Serial Bus (USB), HDMI® (HDMI is a registered trademark in Japan, other countries, or both), or Bluetooth® can be used.

The output interface 35 includes at least one interface for output. The interface for output is, for example, a display or a speaker. The display is, for example, a liquid crystal display (LCD) or an organic electro-luminescent (EL) display. The output interface 35 outputs data obtained by the operations of the terminal apparatus 30. The output interface 35, instead of being included in the terminal apparatus 30, may be connected to the terminal apparatus 30 as an external output device. As an interface for connection, for example, an interface compliant with a standard such as USB, HDMI®, or Bluetooth® can be used.

Figure 5:
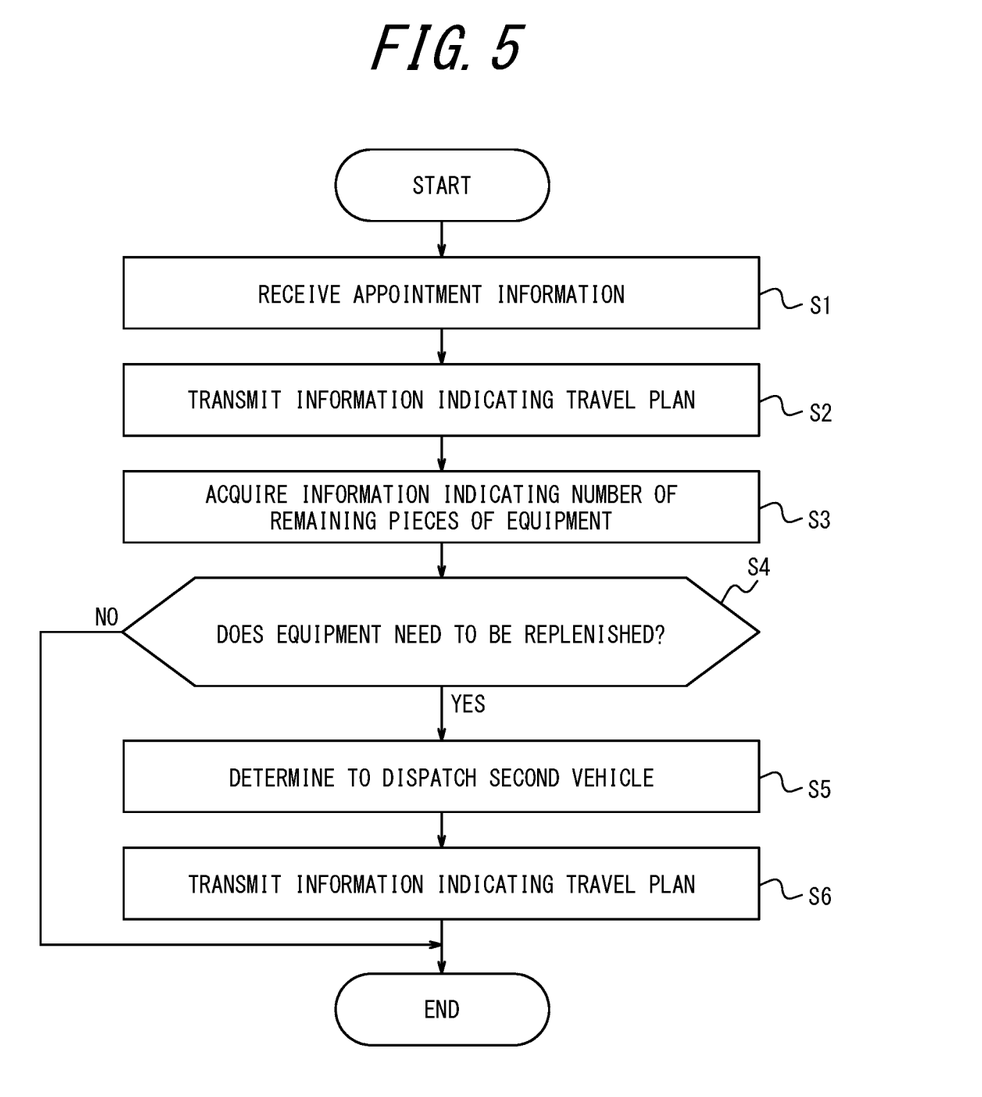
FIG. 5 is a flowchart illustrating operations of the information processing apparatus according to the embodiment of the present disclosure.

Operations of the information processing apparatus 20 according to the present embodiment will be described with reference to FIG. 5. These operations correspond to a method according to an embodiment of the present disclosure.

Step S1: The controller 21 of the information processing apparatus 20 controls the communication interface 22 to receive appointment information on medical checkups.

Specifically, the controller 21 of the information processing apparatus 20 controls the communication interface 22 to receive appointment information on a medical checkup entered by a predetermined user (e.g., a member of a medical checkup service provider) via the first terminal apparatus 30-1. The appointment information may include, but is not limited to, a date and time and a location for the medical checkup, as well as the name, facial information, home information (location information), and the like on an examinee.

Step S2: The controller 21 of the information processing apparatus 20 controls the communication interface 22 to transmit information indicating a predetermined travel plan to the first vehicle 10-1.

Specifically, the controller 21 of the information processing apparatus 20 generates a travel plan that includes a travel route from a predetermined hospital (e.g., a hospital affiliated with the above-mentioned medical checkup service provider), which is a departure location of the first vehicle 10-1, to a predetermined stopping location (e.g., a parking space or a vacant lot), where the medical checkups are to be performed, a travel date and time, and the like. Here, the controller 21 of the information processing apparatus 20 may select, as the predetermined stopping location, a location where a travel distance of each examinee from the examinee's home or the like to the stopping location is optimized (for example, a location where the total travel distance of all examinees is minimized), using the location information on each examinee's home or the like included in the appointment information acquired in step S1. The controller 21 of the information processing apparatus 20 controls the communication interface 22 to transmit information indicating the travel plan to the first vehicle 10-1. The controller 11 of the first vehicle 10-1 thereby automatically travels to the predetermined stopping location by performing steering control, accelerator control, brake control, and the like, using the travel plan received from the information processing apparatus 20 by the communication interface 12 and various types of information acquired by the positioner 14 and the acquisition interface 15. When the first vehicle 10-1 arrives at the predetermined stopping location, medical checkups are performed in the first vehicle 10-1 based on the appointment information acquired in step S1.

Step S3: The controller 21 of the information processing apparatus 20 acquires, via the communication interface 22, information indicating the number of remaining pieces of equipment on board the first vehicle 10-1.

Specifically, the controller 21 of the information processing apparatus 20 controls the communication interface 22 to receive information indicating the number of remaining pieces of equipment on board the first vehicle 10-1, as entered by a staff member via the second terminal apparatus 30-2. The staff member may include, but is not limited to, a doctor, a nurse, or a laboratory technician. The equipment may also include, but is not limited to, syringes, absorbent cotton, bandages, or the like, as well as any consumable items provided for medical checkups.

Step S4: The controller 21 of the information processing apparatus 20 determines, based on the information acquired in step S3, whether the equipment needs to be replenished. In a case in which the equipment needs to be replenished, the process proceeds to step S5. On the other hand, in a case in which the equipment does not need to be replenished, the process ends.

Specifically, the controller 21 of the information processing apparatus 20 determines whether the equipment needs to be replenished, further considering progress of the medical checkups. Here, as the progress of the medical checkups, any index that indicates the status of implementation on the day of the medical checkups in virtually real time (immediately or almost immediately) can be used. For example, the index may be the difference between the number of appointments, which can be calculated as appropriate from the appointment information acquired in step S1, and the number of examinees who have completed the medical checkups, which can be entered as appropriate by the staff member via the second terminal apparatus 30-2. In this case, in a case in which the number of remaining pieces of the equipment is less than the difference, the controller 21 of the information processing apparatus 20 determines that the equipment needs to be replenished. At this time, the controller 21 of the information processing apparatus 20 may calculate as appropriate time to a shortage of the equipment, further considering average diagnosis time per examinee.

Here, the controller 21 of the information processing apparatus 20 may further determine whether the equipment needs to be replenished upon detecting, while the medical checkups are performed, that a predetermined user who has not made an appointment for a medical checkup has got on board the first vehicle 10-1. In this case, to perform such detection, the controller 21 of the information processing apparatus 20 acquires, via the communication interface 22, image information on the user captured by a camera near an entrance of the first vehicle 10-1, for example, and compares and analyzes the image information with the facial information on persons who have made appointments, which is included in the appointment information acquired in step S1. Alternatively, the controller 21 of the information processing apparatus 20 may perform such detection by controlling the communication interface 22 to receive, from the second terminal apparatus 30-2, an answer to a question for the user (whether the user has an appointment) entered by the staff member via the second terminal apparatus 30-2. The same method described above can be used to determine whether the equipment needs to be replenished, using the difference between the total number of the appointments and such users and the number of examinees for whom medical checkups have been completed.

The controller 21 of the information processing apparatus 20 may also present, via the communication interface 22, information regarding acceptance of same-day appointments for medical checkups to the predetermined user based on the progress of the medical checkups. Specifically, the controller 21 of the information processing apparatus 20 determines that same-day appointments for medical checkups can be accepted in a case in which the number of remaining pieces of equipment is greater than the difference between the number of appointments for medical checkups and the number of examinees who have completed medical checkups. The controller 21 of the information processing apparatus 20 then generates information regarding acceptance of same-day appointments. The controller 21 of the information processing apparatus 20 then controls the communication interface 22 to transmit the information regarding acceptance of same-day appointments to the first terminal apparatus 30-1 in the possession of the predetermined user (a user other than persons who have made appointments, identified in any way using the appointment information). This allows the predetermined user to recognize via the output interface 35 of the first terminal apparatus 30-1 that a same-day appointment for a medical checkup is available and to apply for a medical checkup via the input interface 34 of the first terminal apparatus 30-1. The information regarding acceptance of same-day appointments may include, but is not limited to, information indicating, for example, the time and number of available appointments and a location where the medical checkups are to be performed.

Step S5: The controller 21 of the information processing apparatus 20 determines to dispatch the second vehicle 10-2 with new equipment on board to the stopping location of the first vehicle 10-1.

Here, the controller 21 of the information processing apparatus 20 may control the communication interface 22 to transmit a message reporting that the equipment needs to be replenished to a computer or other device installed at a hospital or the like from which the second vehicle 10-2 is to be dispatched. This allows a staff member of the hospital or the like to recognize the message and load equipment into the second vehicle 10-2.

Step S6: The controller 21 of the information processing apparatus 20 controls the communication interface 22 to transmit, to the second vehicle 10-2, information indicating a travel plan to the stopping location of the first vehicle 10-1.

Specifically, the controller 21 of the information processing apparatus 20 generates a travel plan that includes a travel route between the predetermined hospital, which is a departure location of the second vehicle 10-2, and the stopping location of the first vehicle 10-1. The travel plan may be timed as appropriate so that the second vehicle 10-2 arrives at the stopping location of the first vehicle 10-1 before the equipment on board the first vehicle 10-1 runs out, taking into account the time to a shortage of the equipment calculated in step S4. The controller 21 of the information processing apparatus 20 controls the communication interface 22 to transmit information indicating the travel plan to the second vehicle 10-2. The controller 11 of the second vehicle 10-2 thereby automatically travels to the stopping location of the first vehicle 10-1 by performing steering control, accelerator control, brake control, and the like, using the travel plan received from the information processing apparatus 20 and various types of information acquired by the positioner 14 and the acquisition interface 15. When the second vehicle 10-2 arrives at the stopping location of the first vehicle 10-1, the controller 11 of the second vehicle 10-2 controls the driver 16 to transport the equipment on board the second vehicle 10-2 into the first vehicle 10-1. However, the disclosure is not limited to this. For example, the staff member may manually deliver the equipment on board the second vehicle 10-2 into the first vehicle 10-1.

As described above, the controller 21 of the information processing apparatus 20 according to the present embodiment acquires, via the communication interface 22, information indicating the number of remaining pieces of equipment on board the first vehicle 10-1 in which medical checkups are being performed. Upon determining, based on the acquired information, that the equipment needs to be replenished, the controller 21 of the information processing apparatus 20 determines to dispatch the second vehicle 10-2 with new equipment on board to a stopping location of the first vehicle 10-1.

According to such a configuration, medical checkups can be performed continuously without being affected by a shortage or the like of the equipment on board the first vehicle 10-1. Thus, even if the equipment is about to run out during medical checkups, there is no need to interrupt the medical checkups and move the first vehicle 10-1 to replenish the equipment, thereby increasing the number of available appointment slots for medical checkups. Thus, efficiency in performing medical checkups can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

As a variation, an embodiment in which the configuration and operations of the information processing apparatus 20 are distributed to multiple computers capable of communicating with each other can be implemented. For example, an embodiment in which some or all of the components of the information processing apparatus 20 are provided in the vehicles 10 can also be implemented.

As a variation, instead of or in addition to the information indicating the number of remaining pieces of equipment in the embodiment described above, information indicating a work shift of the staff member on board the first vehicle 10-1 in which medical checkups are being performed may be used. In this case, in step S3, the controller 21 of the information processing apparatus 20 acquires, via the communication interface 22, information indicating a work shift of the staff member on board the first vehicle 10-1 in which medical checkups are being performed. The information indicating a work shift may include, but is not limited to, information indicating a time period available for medical checkups. Then, in steps S4 and S5, the controller 21 of the information processing apparatus 20 determines to dispatch the second vehicle 10-2 with a new staff member on board to the stopping location of the first vehicle 10-1 upon determining, based on the acquired information, that the staff member needs to be replaced. Here, in step S4, as in the embodiment described above, the controller 21 of the information processing apparatus 20 may determine whether the staff member needs to be replaced based on progress of the medical checkups. As in the embodiment described above, the controller 21 of the information processing apparatus 20 may also determine whether the staff member needs to be replaced upon detecting, while the medical checkups are performed, that a user who has not made an appointment for a medical checkup has got on board the first vehicle 10-1. As in the embodiment described above, the controller 21 of the information processing apparatus 20 may also present, via the communication interface 22, information regarding acceptance of same-day appointments for medical checkups to a predetermined user based on the progress of the medical checkups. As in the embodiment described above, the controller 21 of the information processing apparatus 20 may also control the communication interface 22 to transmit, to the second vehicle 10-2, information indicating a travel plan for the second vehicle 10-2 to arrive at the stopping location of the first vehicle 10-1 before an end of the work shift of the staff member. Other explanations in the embodiment described above will be applied.

As a variation, an embodiment in which a general purpose computer functions as the information processing apparatus 20 according to the above embodiment can also be implemented. Specifically, a program in which processes for realizing the functions of the information processing apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus comprising a controller configured to:
acquire information indicating a work shift of a staff member on board a first vehicle in which a medical checkup is being performed, or information indicating a number of remaining pieces of equipment on board the first vehicle; and
determine to dispatch a second vehicle with a new staff member on board or new equipment on board to a stopping location of the first vehicle upon determining, based on the acquired information, that the staff member needs to be replaced or the equipment needs to be replenished.

[Appendix 2] The information processing apparatus according to appendix 1, wherein the controller is configured to determine, based on progress of the medical checkup, whether the staff member needs to be replaced or the equipment needs to be replenished.

[Appendix 3] The information processing apparatus according to appendix 1 or 2, wherein the controller determines whether the staff member needs to be replaced or the equipment needs to be replenished upon detecting, while the medical checkup is performed, that a user who has not made an appointment for a medical checkup has got on board the first vehicle.

[Appendix 4] The information processing apparatus according to any one of appendices 1 to 3, wherein the controller is configured to present to a predetermined user, based on progress of the medical checkup, information regarding acceptance of a same-day appointment for a medical checkup.

[Appendix 5] The information processing apparatus according to any one of appendices 1 to 4, wherein the controller is configured to output, to the second vehicle, information indicating a travel plan for the second vehicle to arrive at the stopping location before an end of the work shift or before a shortage of the equipment.

[Appendix 6] The information processing apparatus according to any one of appendices 1 to 5, wherein the staff member includes a doctor, nurse, or laboratory technician.

[Appendix 7] The information processing apparatus according to any one of appendices 1 to 6, wherein the equipment includes a syringe, absorbent cotton, or bandage.

[Appendix 8] A system comprising the information processing apparatus according to any one of appendices 1 to 7, the first vehicle, and the second vehicle.

[Appendix 9] A method performed by an information processing apparatus, the method comprising:

acquiring information indicating a work shift of a staff member on board a first vehicle in which a medical checkup is being performed, or information indicating a number of remaining pieces of equipment on board the first vehicle; and determining to dispatch a second vehicle with a new staff member on board or new equipment on board to a stopping location of the first vehicle upon determining, based on the acquired information, that the staff member needs to be replaced or the equipment needs to be replenished.

[Appendix 10] The method according to appendix 9, further comprising determining, based on progress of the medical checkup, whether the staff member needs to be replaced or the equipment needs to be replenished.

[Appendix 11] The method according to appendix 9 or 10, further comprising determining whether the staff member needs to be replaced or the equipment needs to be replenished upon detecting, while the medical checkup is performed, that a user who has not made an appointment for a medical checkup has got on board the first vehicle.

[Appendix 12] The method according to any one of appendices 9 to 11, further comprising presenting to a predetermined user, based on progress of the medical checkup, information regarding acceptance of a same-day appointment for a medical checkup.

[Appendix 13] The method according to any one of appendices 9 to 12, further comprising outputting, to the second vehicle, information indicating a travel plan for the second vehicle to arrive at the stopping location before an end of the work shift or before a shortage of the equipment.

[Appendix 14] The method according to any one of appendices 9 to 13, wherein the staff member includes a doctor, nurse, or laboratory technician.

[Appendix 15] The method according to any one of appendices 9 to 14, wherein the equipment includes a syringe, absorbent cotton, or bandage.

[Appendix 16] A program configured to cause a computer to execute operations, the operations comprising:

acquiring information indicating a work shift of a staff member on board a first vehicle in which a medical checkup is being performed, or information indicating a number of remaining pieces of equipment on board the first vehicle; and determining to dispatch a second vehicle with a new staff member on board or new equipment on board to a stopping location of the first vehicle upon determining, based on the acquired information, that the staff member needs to be replaced or the equipment needs to be replenished.

[Appendix 17] The program according to appendix 16, wherein the operations further comprise determining, based on progress of the medical checkup, whether the staff member needs to be replaced or the equipment needs to be replenished.

[Appendix 18] The program according to appendix 16 or 17, wherein the operations further comprise determining whether the staff member needs to be replaced or the equipment needs to be replenished upon detecting, while the medical checkup is performed, that a user who has not made an appointment for a medical checkup has got on board the first vehicle.

[Appendix 19] The program according to any one of appendices 16 to 18, wherein the operations further comprise presenting to a predetermined user, based on progress of the medical checkup, information regarding acceptance of a same-day appointment for a medical checkup.

[Appendix 20] The program according to any one of appendices 16 to 19, wherein the operations further comprise outputting, to the second vehicle, information indicating a travel plan for the second vehicle to arrive at the stopping location before an end of the work shift or before a shortage of the equipment.

The invention claimed is:

1. An information processing apparatus comprising a controller configured to:

acquire information indicating a work shift of a staff member on board a first vehicle in which a medical checkup is being performed, or information indicating a number of remaining pieces of equipment on board the first vehicle;

determine to dispatch a second vehicle with a new staff member on board or new equipment on board to a stopping location of the first vehicle upon determining, based on the acquired information, that the staff member needs to be replaced or the equipment needs to be replenished;

generate a travel plan for the second vehicle to arrive at the stopping location of the first vehicle before an end of the work shift or before a shortage of the equipment; and transmit information indicating the travel plan to the second vehicle, wherein the second vehicle automatically travels to the stopping location of the first vehicle based on the information indicating the travel plan.

2. The information processing apparatus according to claim 1, wherein the controller is configured to determine, based on progress of the medical checkup, whether the staff member needs to be replaced or the equipment needs to be replenished.

3. The information processing apparatus according to claim 1, wherein the controller determines whether the staff member needs to be replaced or the equipment needs to be replenished upon detecting, while the medical checkup is performed, that a user who has not made an appointment for a medical checkup has got on board the first vehicle.

4. The information processing apparatus according to claim 1, wherein the controller is configured to present to a predetermined user, based on progress of the medical checkup, information regarding acceptance of a same-day appointment for a medical checkup.

5. The information processing apparatus according to claim 1, wherein the staff member includes a doctor, nurse, or laboratory technician.

6. The information processing apparatus according to claim 1, wherein the equipment includes a syringe, absorbent cotton, or bandage.

7. A method performed by an information processing apparatus, the method comprising:

acquiring information indicating a work shift of a staff member on board a first vehicle in which a medical checkup is being performed, or information indicating a number of remaining pieces of equipment on board the first vehicle;

determining to dispatch a second vehicle with a new staff member on board or new equipment on board to a stopping location of the first vehicle upon determining, based on the acquired information, that the staff member needs to be replaced or the equipment needs to be replenished;

generating a travel plan for the second vehicle to arrive at the stopping location of the first vehicle before an end of the work shift or before a shortage of the equipment; and transmitting information indicating the travel plan to the second vehicle, wherein the second vehicle automatically travels to the stopping location of the first vehicle based on the information indicating the travel plan.

8. The method according to claim 7, further comprising determining, based on progress of the medical checkup, whether the staff member needs to be replaced or the equipment needs to be replenished.

9. The method according to claim 7, further comprising determining whether the staff member needs to be replaced or the equipment needs to be replenished upon detecting, while the medical checkup is performed, that a user who has not made an appointment for a medical checkup has got on board the first vehicle.

10. The method according to claim 7, further comprising presenting to a predetermined user, based on progress of the medical checkup, information regarding acceptance of a same-day appointment for a medical checkup.

11. The method according to claim 7, wherein the staff member includes a doctor, nurse, or laboratory technician.

12. The method according to claim 7, wherein the equipment includes a syringe, absorbent cotton, or bandage.

13. A non-transitory computer readable medium storing a program configured to cause a computer to execute operations, the operations comprising:

acquiring information indicating a work shift of a staff member on board a first vehicle in which a medical checkup is being performed, or information indicating a number of remaining pieces of equipment on board the first vehicle;

determining to dispatch a second vehicle with a new staff member on board or new equipment on board to a stopping location of the first vehicle upon determining, based on the acquired information, that the staff member needs to be replaced or the equipment needs to be replenished;

generating a travel plan for the second vehicle to arrive at the stopping location of the first vehicle before an end of the work shift or before a shortage of the equipment; and transmitting information indicating the travel plan to the second vehicle, wherein the second vehicle automatically travels to the stopping location of the first vehicle based on the information indicating the travel plan.

14. The non-transitory computer readable medium according to claim 13, wherein the operations further comprise determining, based on progress of the medical checkup, whether the staff member needs to be replaced or the equipment needs to be replenished.

15. The non-transitory computer readable medium according to claim 13, wherein the operations further comprise determining whether the staff member needs to be replaced or the equipment needs to be replenished upon detecting, while the medical checkup is performed, that a user who has not made an appointment for a medical checkup has got on board the first vehicle.

16. The non-transitory computer readable medium according to claim 13, wherein the operations further comprise presenting to a predetermined user, based on progress of the medical checkup, information regarding acceptance of a same-day appointment for a medical checkup.

17. The information processing apparatus according to claim 1, wherein the second vehicle automatically transports the new equipment on board the second vehicle into the first vehicle when the second vehicle arrives at the stopping location of the first vehicle.

18. The method according to claim 7, wherein the second vehicle automatically transports the new equipment on board the second vehicle into the first vehicle when the second vehicle arrives at the stopping location of the first vehicle.

19. The non-transitory computer readable medium according to claim 13, wherein the second vehicle automatically transports the new equipment on board the second vehicle into the first vehicle when the second vehicle arrives at the stopping location of the first vehicle.

* * * * *